United States Patent
Gschwind et al.

(10) Patent No.: US 9,256,442 B2
(45) Date of Patent: Feb. 9, 2016

(54) NETWORK UPDATABLE USER TRUSTED DEVICE

(71) Applicant: International Business Machines Corporation, Armonk, NY (US)

(72) Inventors: Thomas Gschwind, Zurich (CH); Frank Hoering, Zurich (CH); Michael P Kuyper-Hammond, Kaltbrunn (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/194,902

(22) Filed: Mar. 3, 2014

(65) Prior Publication Data
US 2015/0248283 A1    Sep. 3, 2015

(51) Int. Cl.
G06F 21/57    (2013.01)
G06F 9/44    (2006.01)
G06F 9/445    (2006.01)

(52) U.S. Cl.
CPC .............. *G06F 9/4416* (2013.01); *G06F 8/665* (2013.01)

(58) Field of Classification Search
None
See application file for complete search history.

(56) References Cited

U.S. PATENT DOCUMENTS

| | | | |
|---|---|---|---|
| 6,931,558 B1* | 8/2005 | Jeffe | G06F 11/1464 713/340 |
| 7,363,480 B1* | 4/2008 | Righi et al. | 713/1 |
| 2002/0065866 A1* | 5/2002 | Sueyoshi | 709/102 |
| 2003/0105847 A1 | 6/2003 | Jennery et al. | |
| 2003/0221094 A1 | 11/2003 | Pennarun | |
| 2004/0254006 A1* | 12/2004 | Lam et al. | 463/16 |
| 2007/0220304 A1* | 9/2007 | Slater | G06F 11/1469 714/4.11 |
| 2009/0055892 A1* | 2/2009 | Lu et al. | 726/2 |
| 2011/0131447 A1* | 6/2011 | Prakash et al. | 714/19 |
| 2011/0230790 A1* | 9/2011 | Kozlov | 600/595 |
| 2012/0284495 A1* | 11/2012 | Domsch | G06F 9/4416 713/2 |
| 2013/0268771 A1* | 10/2013 | Blankenbeckler et al. | 713/189 |

FOREIGN PATENT DOCUMENTS

JP    2011 145947 A    7/2011

OTHER PUBLICATIONS

Hendricks et al., Secure Bootstrap Is Not Enough: Shoring up the Trusted Computing Base, 2004.*

(Continued)

*Primary Examiner* — Wei Zhen
*Assistant Examiner* — Zhan Chen
(74) *Attorney, Agent, or Firm* — Cahn & Samuels, LLP (57) ABSTRACT

A user trusted device and a software update method for updating the device. The device includes: a connection interface enabling connection with a host computer; a persistent memory storing a boot enabling data structure and a network updater, wherein: the network updater is configured to interact with firmware of the host computer to initiate communication over a network; and the boot enabling data structure: is detectable by the firmware upon connection of the user trusted device with the host computer; is such that host computer can boot from the user trusted device, as per the data structure of the boot enabling data structure; and includes instructions for the firmware to initiate a transfer of the network updater on the host computer for subsequent execution, upon the host computer booting from the user trusted device.

20 Claims, 4 Drawing Sheets

(56) References Cited

OTHER PUBLICATIONS

The Zurich Trusted Information Channel—An Efficient Defence against Man-in-the-Middle and Malicious Software Attacks, Thomas Weigold et al. TRUST 2008, LNCS 4968, pp. 75-91, 2008.

Press Release, Migros Bank, Migros Bank Launches New System for safer E-Banking (Jan. 17, 2008), available at http://www.docstoc.com/docs/39812530/Migros-Bank-launches-new-System-for-safer-E-Banking (accessed Oct. 4, 2013).

* cited by examiner

NETWORK UPDATABLE USER TRUSTED DEVICE

BACKGROUND OF THE INVENTION

1. Field of the Invention

The invention relates in general to the field of user trusted devices equipped with a connection interface for connecting to a host computer, and in particular to software update methods for updating such devices via a network.

2. Description of the Related Art

User trusted devices (including secure, tamper proof devices) are generally known. For example, for online transactions, a solution which has been developed is the so-called Zone Trusted Information Channel (or ZTIC for short). The ZTIC is a secure, non-programmable device for the authentication of transaction data. Since the ZTIC maintains a secured end-to-end network connection to the server, the ZTIC itself is tamper-proof against malicious software attacks and as it has its own input and output components independent of the host it connects to, the data shown on the ZTIC display is genuine. More details can be found in e.g., The Zurich Trusted Information Channel—An Efficient Defence against Man-in-the-Middle and Malicious Software Attacks, by Thomas Weigold, Thorsten Kramp, Reto Hermann, Frank Höring, Peter Buhler, Michael Baentsch. In P. Lipp, A.-R. Sadeghi, and K.-M. Koch (Eds.): TRUST 2008, LNCS 4968, pp. 75-91, 2008. Springer-Verlag Berlin Heidelberg 2008.

Some secure devices that have a built in network card (e.g., routers, storage attached network devices) provide a functionality to be network updatable. These devices, however, need their own network connection.

Other devices use a secure channel through a PC to be updatable (such as the Migros banking memory stick, see e.g., http://www.kobil.com/nc/press-news/newssingleview/article/migros-bank-launches-new-system-for-safer-e-banking.html?tx_ttnews%/5BbackPid%5D=596&cHash=4480355b72). However, these devices require a given operating system to be available on the PC for the update to be successful.

SUMMARY OF THE INVENTION

According to a first aspect of the present invention, a user trusted device is provided. The device includes: a connection interface enabling connection with a host computer; a persistent memory storing a boot enabling data structure and a network updater, wherein, the network updater is configured to interact, upon execution at the host computer, with a firmware of the host computer to initiate a communication over a network to which the host computer is connectable; and the boot enabling data structure: is detectable by the firmware upon connection of the user trusted device with the host computer; is such that the host computer can boot from the user trusted device, as per the data structure of the boot enabling data structure; and includes instructions for the firmware to initiate a transfer of the network updater on the host computer for subsequent execution at the host computer, upon the host computer booting from the user trusted device.

According to another aspect, the present invention can be embodied as a system. The system includes: a server to be contacted upon initiating communication over a network; a host computer; and a user trusted device including: a connection interface enabling connection with the host computer; a persistent memory storing a boot enabling data structure and a network updater; wherein the network updater: comprises a reference to the server, and is configured to interact, upon execution at the host computer, with a firmware of the host computer to initiate a communication over a network to which the host computer is connectable; and wherein the boot enabling data structure: is detectable by the firmware upon connection of the user trusted device with the host computer, is such that the host computer can boot from the user trusted device, as per a data structure of the boot enabling data structure, and comprises instructions for the firmware to initiate a transfer of the network updater on the host computer for subsequent execution at the host computer, upon the host computer booting from the user trusted device.

According to another aspect, the present invention can be embodied as a method for initiating communication between a user trusted device according to any one of the above embodiments and a network, the user trusted device connectable to a host computer, the host computer connectable to the network. The method includes: allowing the boot enabling data structure of the user trusted device be detected by a firmware of the host computer; booting the host computer from the user trusted device; and transferring a network updater to the host computer, so that the network updater executes at the host computer and interacts with the firmware to initiate a communication over the network.

According to yet another aspect, the present invention is embodied as a computer program product for initiating communication between a user trusted device and a network, the computer program product including a computer-readable storage medium having a boot enabling data structure and a network updater embodied therewith, wherein: the network updater is configured to interact, upon execution at a host computer, with a firmware of the host computer to initiate a communication over a network to which the host computer is connectable; and the boot enabling data structure: is detectable by the firmware upon connection of the user trusted device with the host computer; is such that host computer can boot from the user trusted device, as per the data structure of the boot enabling data structure; and includes instructions for the firmware to initiate a transfer of the network updater on the host computer for subsequent execution at the host computer, upon the host computer booting from the user trusted device.

Devices, systems, and methods embodying the present invention will now be described, by way of non-limiting examples, and in reference to the accompanying drawings.

DETAILED DESCRIPTION OF THE PREFERRED EMBODIMENTS

The following description is structured as follows. First, general embodiments and high-level variants are described. Next, more specific embodiments and technical implementation details are addressed.

Figure 1:
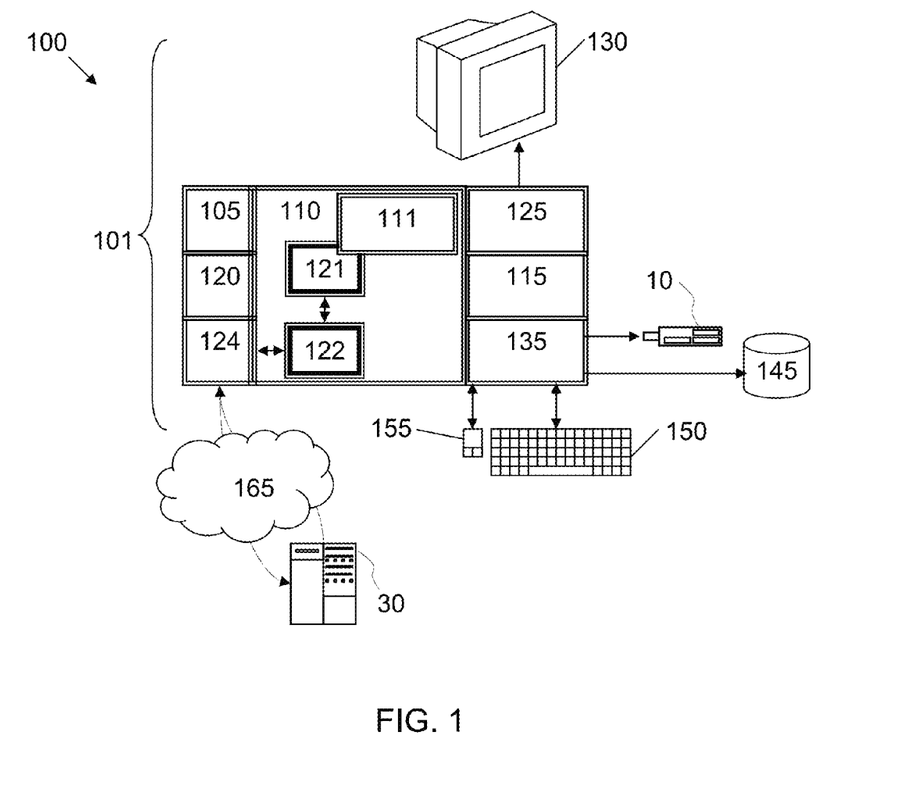
FIG. 1 represents a general computerized system, suited for implementing a method for initiating communication between a user trusted device and a network, according to an embodiment of the present invention.

FIG. 1 represents a general computerized system, suited for implementing a method for initiating communication between a user trusted device and a network, according to embodiments of the present invention.

It will be appreciated that the methods described herein are largely non-interactive, and automated by way of computerized systems, such as servers or embedded systems. In exemplary embodiments, the methods described herein can be implemented in a (partly) interactive or non-interactive system. These methods can further be implemented in software (e.g., firmware), hardware, or a combination thereof. In exemplary embodiments, the methods described herein are implemented in software, as an executable program, and are executed by a special or general-purpose digital computer, such as a personal computer, workstation, minicomputer, or mainframe computer. The most general system 100 therefore includes general-purpose computer 101.

In exemplary embodiments, in terms of hardware architecture, as shown in FIG. 1, computer 101 includes a processor 105, memory 110 coupled to a memory controller 115, and one or more input and/or output (I/O) devices (or peripherals) 10, 145 that are communicatively coupled via a local input/output controller 135. Input/output controller 135 can be, but is not limited to, one or more buses or other wired or wireless connections, as is known in the art. Input/output controller 135 can have additional elements, which are omitted for simplicity, such as controllers, buffers (caches), drivers, repeaters, and receivers, to enable communications. Further, the local interface can include address, control, and/or data connections to enable appropriate communications among the aforementioned components. As described herein, I/O devices 10, 145 can generally include any generalized cryptographic card or smart card known in the art.

One of these devices is a user trusted device 10, discussed below in detail.

Processor 105 is a hardware device for executing software, particularly software that is stored in memory 110. Processor 105 can be any custom made or commercially available processor, a central processing unit (CPU), an auxiliary processor among several processors associated with computer 101, a semiconductor based microprocessor (in the form of a microchip or chip set), a macroprocessor, or generally any device for executing software instructions.

Memory 110 can include any one or combination of volatile memory elements (e.g., random access memory (RAM, such as DRAM, SRAM, SDRAM, etc.)) and nonvolatile (persistent) memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, memory 110 can incorporate electronic, magnetic, optical, and/or other types of storage media. Note that memory 110 can have a distributed architecture, where various components are situated remote from one another, but can be accessed by processor 105. In particular, memory 110 shall include a memory portion 121 to which network updater 15 can be transferred, in whole or in part, for subsequent execution.

Software in memory 110 can include one or more separate programs, each of which includes a listing of executable instructions for implementing logical functions, notably functions involved in embodiments of this invention. In the example of FIG. 1, memory 110 can be loaded with software including instructions for implementing methods for initiating communication between user trusted device 10 and a network 165.

The software in memory 110 can also typically include a suitable operating system (OS) 111, even if the novel methods discussed here ignores the OS of host 101 (they operate at another level, closer to hardware, whereby the normal behavior of computer 101 is impacted). Once (and if) loaded, OS 111 essentially controls the execution of other computer programs, and provides scheduling, input-output control, file and data management, memory management, and communication control and related services.

At least part of the methods described herein can be in the form of a source program, executable program (object code), script, or any other entity having a set of instructions to be performed. When a source program, then the program needs to be translated via a compiler, assembler, interpreter, or the like, which can or can not be included within the memory of device 10 and/or host 101. Furthermore, the methods can be written as an object oriented programming language, which has classes of data and methods, or a procedure programming language, which has routines, subroutines, and/or functions. In all cases, the novel methods discussed herein are designed so as to operate properly in connection with firmware 122, and with the device's CPU 11 if needed.

In exemplary embodiments, a conventional keyboard 150 and mouse 155 can be coupled to input/output controller 135. Other output devices such as I/O devices 145 can include input devices, for example but not limited to a printer, a scanner, microphone, and the like. Finally, I/O devices 10, 145 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As described herein I/O devices 10, 145 can be any generalized cryptographic card or smart card known in the art. System 100 can further include a display controller 125 coupled to a display 130. In exemplary embodiments, system 100 can further include a network interface 160 for coupling to a network 165. Network 165 can be an IP-based network for communication between computer 101 and any external server, client and the like via a broadband connection. Network 165 transmits and receives data between computer 101 and external systems, e.g., a server 30. In exemplary embodiments, network 165 can be a managed IP network administered by a service provider. Network 165 can be implemented in a wireless fashion, e.g., using wireless protocols and technologies, such as WiFi, WiMax, etc. Network 165 can also be a packet-switched network, such as a local area network, wide area network, metropolitan area network, Internet network, or other similar type of network environment. Network 165 can be a fixed wireless network, a wireless local area network (LAN), a wireless wide area network (WAN) a personal area network (PAN), a virtual private network (VPN), intranet or other suitable network system and includes equipment for receiving and transmitting signals.

If computer 101 is a PC, workstation, intelligent device or the like, the software in memory 110 can further include a basic input output system (BIOS) 122. The BIOS is a set of essential software routines that initialize and test hardware at startup, start OS 111, and support the transfer of data among the hardware devices. The BIOS is typically stored in ROM so that the BIOS can be executed when computer 101 is activated.

For the purpose of implementing methods as described herein, BIOS 122 can be used to initiate a communication over a network 165 to which host computer 101 is connectable. More generally though, any suitable firmware 122 or interface to a firmware (i.e., a combination of persistent memory and program code and data stored therein, which operates "below" operating system 111 in the software stack), can be used to that aim. This typically is the BIOS. However, examples of suitable firmware 122 or interface thereto include a Preboot eXecution Environment (PXE) BIOS, the so-called Extensible Firmware Interface (EFI) BIOS or, still, the Unified Extensible Firmware Interface (UEFI). The latter is a specification that defines a software interface between the operating system and the platform firmware. UEFI is meant to replace the BIOS firmware interface, present in all IBM PC-compatible computers today. In practice, most UEFI images have legacy support for BIOS services. More generally, any firmware having legacy support for BIOS services or comparable services can be contemplated for the purpose of implementing methods described herein. Even more generally, any firmware, e.g., initialization firmware, capable of initiating a communication over a network, e.g., via interaction with a network card of the host computer (e.g., to initialize the network card), and operating below the operating system in the software stack can convene for the purpose of implementing the present invention.

When computer 101 is in operation, processor 105 is configured to execute software stored within memory 110, to communicate data to and from memory 110, and to generally control operations of computer 101 pursuant to the software. The methods described herein, in whole or in part, but typically the latter, are read by processor 105, possibly buffered within processor 105, and then executed.

The portions of the methods described herein that can be implemented in software can be stored on any computer readable medium for use by or in connection with any computer related system or method.

As will be appreciated by one skilled in the art, aspects of the present invention can be embodied as a system, method, or computer program product. Accordingly, aspects of the present invention can take the form of an entirely hardware embodiment, an entirely firmware and/or software embodiment (firmware, resident software, micro-code, etc.) or an embodiment combining firmware/software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, or partly on the user's computer (as a stand-alone software package), or still partly on two or more of the following: the user's computer, the user trusted device, and a remote computer. The host computer and the server can be connected through any type of network, including: local area network (LAN); wide area network (WAN); connection to an external computer (Internet, using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring generally to FIGS. 1 to 4, an aspect of the invention is first described, which concerns a secure device 10 (or more generally a user trusted device). This device is a corporate or personal device, that is, a device that a company or a user owns and controls, such as a USB device, preferably a USB flash drive (a data storage device that includes flash memory, in addition to an integrated Universal Serial Bus (USB) interface), a mobile phone or a personal digital assistant (PDA) that only this user uses or that is owned and controlled by the company this user works for. Typically, this device weighs less than 100 g, preferably less than 60 g and more preferably less than 40 g. Additional aspects of this device 10 that can contribute to make it "secure" shall be discussed later.

Figure 3:
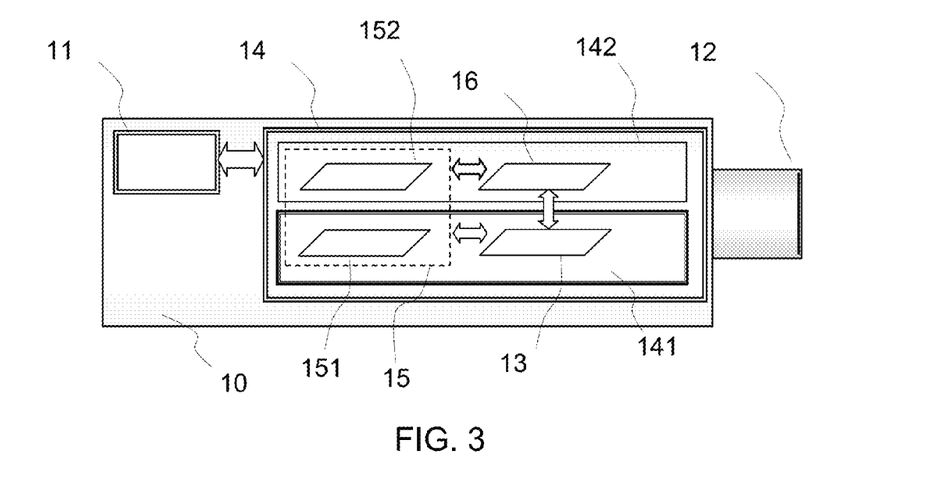
FIG. 3 is a simplified representation of selected components of a secure device and how these components interrelate functionally according to an embodiment of the present invention.

At least, this device includes: a connection interface 12 enabling connection S2 with host computer 101; and a persistent memory 14 storing notably two components: a boot enabling data structure 16 and a network updater 15, which are designed to interact as follows.

First, network updater 15 is software to be executed on host computer 101. More precisely, it is configured to interact, upon execution at the host 101, with firmware 122, e.g., the BIOS, of the host computer to initiate a communication over a network 165 to which the host computer is connectable. Thus, network updater 15 shall execute on host computer 101 upon booting, i.e., before the operating system is loaded. In other words, the operating system is bypassed: the network updater shall execute and be able to perform its natural function, i.e., updating, without the operating being involved. In practice, updater 15 is a small software update program, which can e.g., be stored inside the device firmware.

Second, boot enabling data structure 16 (also referred to as a boot loader below) is detectable by firmware 122 upon connection of secure device 10 with host computer 101. The boot loader is furthermore designed such that host computer 101 can boot from secure device 10, upon restarting. This functionality can for instance be provided as per the data structure of the boot loader itself, as known per se. Finally, boot loader 16 includes instructions for firmware 122 to initiate a transfer of network updater 15 on host computer 101 for subsequent execution at host computer 101, upon the host computer booting from secure device 10.

Transfer in this context means that the firmware initiates the action of storing the network updater on a suitable host computer's memory portion 121, e.g., this preferably occurs when one or more (e.g., a few) first blocks of the network updater are being read by host 101.

In embodiments, the network updater is configured to interact, upon execution at the host computer, with the firmware of the host computer to subsequently interact with a network card of the host computer, in order to initiate the communication over the network as enabled by the network card.

The network updater includes a reference to a server to be contacted upon initiating the communication over the network.

In preferred embodiments, the user trusted device includes no network card (or more generally is lacking networking functionality).

The persistent memory includes: a secure memory, onto which is stored a first part of the network updater; and a non-secure memory, onto which is stored a second part of the network updater.

In embodiments, the second part of the network updater resides encrypted on the non-secure memory, a corresponding encryption key being stored on the secure memory.

The second part of the network updater occupies less than half a size of the secure memory, the memory size preferably less than or equal to 256 ko, more preferably less than or equal to 128 ko.

In preferred embodiments, the network updater is configured to interact, upon execution at a host computer, with a firmware of the host computer to initiate the communication, the firmware being one of the following: BIOS, preferably with a PXE BIOS; Extensible Firmware Interface BIOS; or Unified Extensible Firmware Interface BIOS.

The connection interface is of one of the following types: Universal Serial Bus or USB; External Small Computer System Interface or SCSI; External Serial Advanced Technology Attachment or SATA; Firewire; or Thunderbolt.

Thus, to summarize: boot loader 16 is detectable by firmware (BIOS) 122 upon connection of device 10 to host 101, whereby the host can boot from secure device 10. Boot loader 16 includes instructions for firmware 122 to initiate a transfer of network updater 15 on host 101 for subsequent execution at host computer 101, upon booting. When executing at host 101, network updater 15 interacts with firmware (BIOS) 122 to initiate a communication over network 165.

Such a solution makes device 10 easily updatable from the network, even if device 10 is not equipped with a network card or more generally has no direct network access. In fact, device 10 is preferably not equipped with such direct network access means, a thing that allows for simpler and cheaper designs for this device 10. No specific software/OS is furthermore required on host 101 for performing the update, beyond firmware 122. In fact, host 101 can be empty, even without any hard drive.

Host 101 boots from device 10, which can in turn make use of the computers built-in network card (or more generally network access means) in combination with the computer's BIOS, or any similar firmware (PXE BIOS for current computers, EFI or UEFI BIOS for future computers).

No trace is left on the hosting computer. In addition, any user can easily update device 10 to perform different/new functionalities at device 10. This solution enables extremely simple update processes e.g., insert device 10 into a computer 101, restart, and choose the new functionality. No special hardware/software/knowledge is required to reconfigure the device. The hardware can always stay the same.

Device 10 can further be tuned to different application scenarios, beyond the mere software updates. Not all the software on device 10 has to be stored in a secure storage. The software updates and parts of the application updater can be stored on a simple SD card.

However, updates or changes of functionality can still be performed securely even though it can partly rely on an otherwise insecure SD card (as discussed in reference to some embodiments below).

For instance, the update can be brought securely into the device, e.g., by means of an HTTP connection from server to device 10 through computer 101; end-end authentication; signature and other encryption data 13 can be stored in a secure memory on the device; payload can be stored on a SD card; and verification can be performed during a next access.

In contrast, any comparable prior art device so far requires a specific software on PC 101 to update the device, which specific software needs to be written for various OSs and need to be run from within the OS, leading to compatibility issues. This raises security concerns and questions as to whether one can trust the OS. Also, other comparable prior art devices require a software update to be put on an SD card and insert the card into an SD card slot, which is not at all practical and is more expensive, since it requires an extra SD card slot or the like; is cumbersome, needs to be prepared manually; and does not make it easy for the update to be controlled from a central server.

Figure 2:
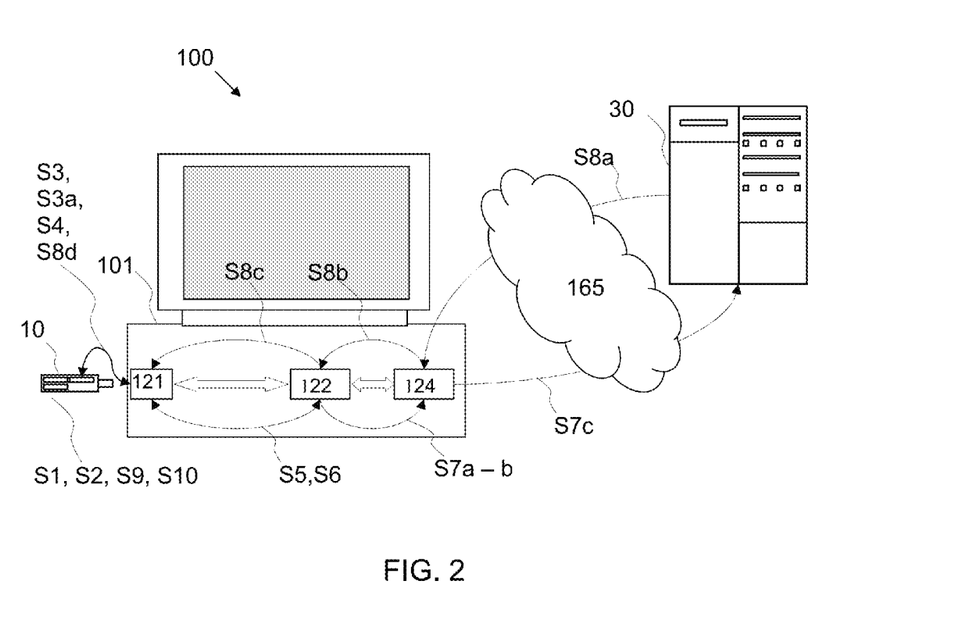
FIG. 2 illustrates chosen components of the computerized system of FIG. 1, together with a flowchart illustrating the method, according to an embodiment of the present invention.

Referring now to FIGS. 1 and 2, preferably, a network card 124 of host computer 101 is relied upon in the process. Namely, network updater 15 is preferably configured to interact, upon execution at host 101, with firmware 122 to subsequently interact with a network card 124 (e.g., to initialize the network adapter) of host 101, and this, in order to initiate the communication over the network, which is otherwise enabled by network card 124. Still, other I/O devices can be used to achieve the same.

Network updater 15 can include a reference to a server 30 to be contacted upon initiating the communication over the network. This reference can for instance be hardcoded in updater 15. More generally, updater 15 can include any suitable means (algorithm, etc.) for determining the server.

Naturally, embodiments of the present invention extend to a general computerized system such as depicted in FIG. 1 or 2, i.e., including: secure device 10, server 30, and preferably host computer 101.

In terms of method steps, the invention can be embodied as follows, i.e., as a method for initiating communication between secure device 10 and a network 165. Such a method is now described in reference to FIG. 4. First (step S1), a system such as evoked above is provided, which, broadly, includes secure device 10, host 101, a network 165 to which the host can be connected. Second (step S2), secure device 10 is connected to host 101, host 101 is (re-)started. The computer needs be (re-)started after connecting device 10 thereto, or otherwise put into a state that allows it to start from the external device, e.g., the following options are therefore possible: Computer 101 is shut-off; plug device 10; start computer; or computer 101 is already running; plug device; restart computer. Step S3: the boot enabling data structure of secure device 10 is detected S3 by firmware 122 of host computer 101. Step S3a: host computer 101 boots from secure device 10. Subsequently (step S4), network updater 15 is transferred to host 101, for instance to memory portion 121, whereby (step S5), network updater 15 executes at host computer 101; and interacts (step S6) with firmware 122, to initiate (steps S7, S7a, S7b) a communication over network 165.

The method further includes: causing the network updater to interact with the firmware of the host computer to subsequently interact with a network card of the host computer, in order to initiate the communication over the network as enabled by the network card.

The method further includes: contacting a server referenced by the network updater, upon initiating the communication over the network.

In embodiments, the method further includes: transferring data, a user trusted device firmware update, from the server to the user trusted device; storing the transferred data on a memory, preferably a persistent memory, of the user trusted device; and updating software of the user trusted device according to the transferred data as stored on the memory of the user trusted device.

Figure 4:
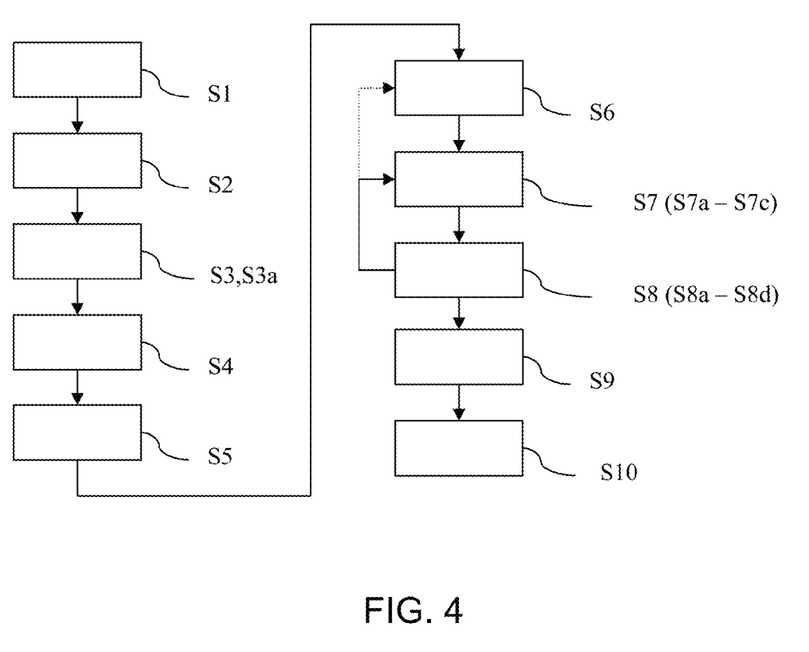
FIG. 4 is a flowchart illustrating high-level steps of a method for initiating communication between a secure device and a network, according to an embodiment of the present invention.

Preferably, where a network card is involved, network updater 15 shall interact with firmware 122 (at step S6) to subsequently interact (step S7a) with network card 124 (e.g., to initialize the network adapter) of host 101, in order to initiate (step S7b) the communication over the network as enabled by the network card.

For illustration, examples of instructions used by updater 15 to initialize a PXE BIOS include but are not limited to:
Algorithm: Initialization of the PXE BIOS by the Updater
Load UNDI ROM P PXENV_START_UNDI
PXENV_UNDI_STARTUP
PXENV_UNDI_INITIALIZE
PXENV_UNDI_OPEN An additional instruction (e.g., PXENV_UNDI_TRANSMIT) can be appended to send packets to the server, via the network card. By way of such instructions, the network updater interacts, upon execution at the host, with PXE BIOS 122 to initialize network card 124, by which a communication can be initiated over the network.

Similar instructions are provided by EFI and UEFI BIOSes in the EFI_SIMPLE_NETWORK API (Initialize, Start, Stop, Receive, Transmit). BIOSes can also provide higher level protocol implementations of the TCP/IP stack and other networking protocols which can be used as well.

As earlier, the communication is preferably initiated for contacting (step S7c) a server 30, which can be determined thanks to network updater 15, upon initiating the communication over the network.

Amongst the various applications that can be contemplated with the present invention, subsequent steps can preferably consist in transferring data (steps S8, S8a-S8d), preferably a secure device firmware update, from server 30 to secure device 10; storing (step S8d) the transferred data on a memory (persistent or not) of secure device 10; and, preferably, updating (step S9) software of the secure device (e.g., firmware) according to the transferred data as stored on the memory of secure device 10.

Different types of software (be it firmware, control software, or only parts thereof) can be contemplated here. Such software can be stored on the device and shall preferably be updated as update units.

Thus, a typical scenario is the following. Device 10 is first connected to computer 101 and the computer is restarted. When restarted, the computer boots from the device and starts the network updater, after having transferred the updater from the device. Then, the updater interacts with the BIOS to use the network card of the computer, in order to establish a secure network connection to a server and retrieve updates. Updates are transferred back to the device for it to update one or more update units stored on the device. In most simple scenarios, an update is downloaded, which allows new/updated functionalities to be implemented at device 10. After an update, the device can for instance include new banking functionalities or Secure Enterprise Desktop functionalities. More generally, device 10 can be updated to perform different operations using the network update.

Yet, beyond the mere update of existing functionalities, other applications can be contemplated, where a boot loader prompts the host to transfer and execute the network updater, configured to interact with a firmware to initiate a communication. In this respect, let us remind that "network updater" is a name given to some software piece, initially located on device 10, and whose function is, in the context of this invention, most generally to interact, upon execution at the host, with a firmware thereof to initiate a communication over a network to which the host is otherwise connectable. This function accordingly allows for performing some "update" via a network, even though device 10 lacks networks capacity.

In addition, note that, notwithstanding the diagram of FIG. 2, the path taken by the update data (step S8) downloaded from server 30 can be exactly reversed to the path taken to initiate the communication with server 30 (steps S3-S7), or not. In particular, the update data can be buffered in another portion of memory than portion 121.

Next, referring back to FIG. 3, and as touched earlier, persistent memory 14 shall preferably include: a secure memory 141, onto which is stored a first part 151 (or given portions) of the network updater 15; and a non-secure memory 142, e.g., a SD card, onto which is stored a second part 152 (or other portions) of network updater 15.

The presence of a secure memory contributes to make the user trusted device a secure device. For example, a part of network updater 15 can reside encrypted on non-secure memory 142, while a corresponding encryption key is stored on secure memory 141. The secure memory is typically limited to 128 ko or 256 ko, for cost reasons. It can thus preferably be used to merely store encryption data, e.g., hashes/signatures. Part 151 of the updater can therefore reside on secure memory 141 while other parts 152 of updater 15 shall reside encrypted on the non-secure memory. Similarly, boot loader 16 can reside on the SD card too, yet encrypted with signature residing on secure memory 141. When host computer 101 requests a given block or any data chunk of the boot enabling structure, then the device's CPU 11 shall be prompted by software residing in memory 14 to decrypt the requested block, e.g., using encryption data stored on secure memory 141.

Preferably, the portion(s) of network updater 15 that reside on the secure memory shall occupy less than half a size of the secure memory, owing to memory constraints. Ideally though, both parts of network updater 15 shall occupy as little memory as possible. For instance, some implementations of network updater 15 have been successfully tested which use less then 64 ko for each part.

Connection interface 12 of device 10 can for instance be of the following type: Universal Serial Bus or USB; External Small Computer System Interface or SCSI; External Serial Advanced Technology Attachment or SATA; Firewire; or Thunderbolt.

More generally though, this can be any current or future connector that allows the computer to boot from external device 10. In addition, same interface 12 can furthermore allow the user trusted device for communicating with any external device such as a beamer, a printer, or any other output device.

As usual, user trusted device 10 can be provided with processing means (or computing means, i.e., CPU) 11, such as a crypto Processor, coupled to a memory, which more generally includes both a persistent memory 14 and a non-persistent memory (not shown).

In the present context, the persistent memory notably stores computerized methods, e.g., components 15, 16 evoked above, to be executed by processing means 11.

If necessary, the secure device has a card reader to read user credentials stored on a memory card, e.g., non-secure memory 142 or any smart card. Suitable use can safely be made out of such data, e.g., user credentials as stored on the card. In particular, a trustworthy connection can be established between a user (or strictly speaking device 10) and a third party, e.g., a server, via the terminal and using such data. In a variant, the user credentials can be stored directly on the secure device. Further interfaces (like control buttons and display) can be provided to allow for interaction with the user.

The above embodiments have been succinctly described in reference to the accompanying drawings and can accommodate a number of variants. Several combinations of the above features can be contemplated. Examples are given in the next section.

A specific embodiment is discussed now, which combine several optional features discussed in the previous section. This embodiment is again described in reference to FIG. 4. Step S1, a secure device 10, a PC 101, and a network 165 are provided. Step S2, secure device 10 is connected to the PC 101, and the PC is restarted. Step S3, boot loader 16 of device 10 is detected by BIOS 122 of PC 101. Step S3a, PC 101 boots from secure device 10. Step S4, network updater 15 is transferred to a memory of PC 101, whereby updater 15 executes at PC 101 (step S5); and interacts with BIOS 122 (step S6) to initialize network adapter 124 of PC 101 (step S7a), in order to initiate a communication over network 165, whereby server 30 is contacted, through the PC's network adapter (step S7b). The server to contact is determined by updater 15. Steps S8a-S8d, data is transferred back to device 10, starting with connection data such that an end-to-end connection between server 30 and device 10 be established. Meanwhile, the updater is still active, forwarding data to the server on behalf of device 10 and to the security device on behalf of the server. The following authentication scheme can for instance be implemented: authenticate server and possibly the client, e.g., by performing a handshake; determine new device firmware, or software update, which can be determined by a server administrator or by letting the user decide either on the PC through the updater or on the security device through some I/O mechanism of the security device. Step S8d, the transfer of the update from the server to the client is completed and the update is stored on a memory (persistent or not) of device 10. At this point, another update can be initiated (which amounts to go back to step S7 or even S6 if the update is to be performed from a different server), else the connection is closed. Next, step S9, the security device unpacks the data it has received and depending on how it was transferred (SSL, clear, etc.) it performs an integrity check. The device copies the unpacked data into (non-volatile) memory that can be securely controlled by the device software of secure device 10 (e.g., firmware thereof), whereby an update is performed at device 10. Note that step S9 can actually be carried out in parallel to initiating another update or while this other update is being transferred into the device, provided that appropriate rollback mechanisms are in place. Although current user trusted devices do typically not have enough computing power to do this in parallel, solutions are currently being tested which allow for such a functionality. Additionally, the device can reboot at various stages after the update has been downloaded. If the device reboots, the downloaded data can have to be verified again if stored on non-secure memory.

Note that step S9 can be performed any time after the update is received. If the transfer is not complete, the firmware update can not be complete and can have to be restarted. The device can reboot at various steps, i.e., at any point during the update (at the device), to ensure a clean state (e.g., after the new firmware has been received and if the buffer-memory is non-volatile across reboots). Once the update has been received the computer can still be necessary, i.e., to provide power to the security device (if the latter is not self powered), or not, i.e., if the security device has its own battery.

In addition, instead of using the network functionality of PC 101, other components of computer 101 (providing storage) can be used as well to provide a firmware update (although less practical).

Also note that, in principle, interaction with the BIOS can be omitted if the device is capable of bringing its own network device driver (this can not be according to this invention). Yet, in this case only those computers equipped with a network card for which a device driver is present on the security device can be used for updating the device, which can be much less practical.

The device is connected to the PC through any connection facility that allows the PC to be booted from the device. Depending on the connector chosen, a smaller or wider range of computers can be useful (e.g., USB, firewire, eSATA, etc.).

As touched earlier, different applications can be contemplated: Of primary interest are security devices like banking devices, secure boot, or secure storage devices, etc. Of especial interest are devices from which a host computer is to be, or likely to be booted anyways, for instance, to create a secure computing environment. However, a wider class of devices can be updated through the same mechanism, in which case security mechanisms such as handshake, integrity verification, etc., can possibly be omitted.

While the present invention has been described with reference to a limited number of embodiments, variants and the accompanying drawings, it will be understood by those skilled in the art that various changes can be made and equivalents can be substituted without departing from the scope of the present invention. In particular, a feature (device-like or method-like) recited in a given embodiment, variant or shown in a drawing can be combined with or replace another feature in another embodiment, variant or drawing, without departing from the scope of the present invention. Various combinations of the features described in respect of any of the above embodiments or variants can accordingly be contemplated, that remain within the scope of the appended claims. In addition, many minor modifications can be made to adapt a particular situation to the teachings of the present invention without departing from its scope. Therefore, it is intended that the present invention not be limited to the particular embodiments disclosed, but that the present invention will include all embodiments falling within the scope of the appended claims. In addition, many variants not explicitly touched above can be contemplated. For example, the secure device can be powered with solar cells or any other suitable batteries, etc. Furthermore, the computerized methods described herein have been categorized according to their main functions: enabling a computer 101 to start booting from external device 10; and initiate a communication over the network. These main functions have been described as being assigned to respective modules 15, 16, for the sake of clarity of the description. However, embodiments of the present invention can be equivalently described with the same functions distributed over one or more modules, each provided with different ones of these functions. For example, boot enabling data structure 16 and network updater 15 can be regarded as a single module, possibly referred to as a "bootloader", while still performing the same functions as otherwise described herein.

What is claimed is:

1. A mobile phone comprising:
   a connection interface enabling connection with a host computer;
   a persistent memory storing a boot enabling data structure and a network updater, said persistent memory including:
      a secure memory, onto which is stored a first part of the network updater, and
      a non-secure memory, onto which is stored a second part of the network updater,
   wherein the second part of the network updater resides encrypted on the non-secure memory, a corresponding encryption key being stored on the secure memory,
   wherein the network updater is configured to interact, upon execution at the host computer, with a firmware of the host computer to initiate a communication over a network to which the host computer is connectable; and
   wherein the boot enabling data structure:
      is detectable by the firmware upon connection of the mobile phone with said host computer;
      is such that the host computer can boot from the mobile phone, as per a data structure of the boot enabling data structure; and
      includes instructions for the firmware to initiate a transfer of said network updater on the host computer for subsequent execution at the host computer, upon the host computer booting from the mobile phone.

2. The mobile phone of claim 1, wherein said network updater is configured to interact, upon execution at said host computer, with said firmware of the host computer to subsequently interact with a network card of the host computer, in order to initiate said communication over the network as enabled by said network card.

3. The mobile phone of claim 1, wherein the network updater comprises a reference to a server to be contacted upon initiating said communication over the network.

4. The mobile phone of claim 1, wherein said mobile phone comprises no network card.

5. The mobile phone of claim 1, wherein the second part of the network updater occupies less than half a size of the secure memory, said memory size is less than or equal to 256 kb.

6. The mobile phone of claim 1, wherein said network updater is configured to interact, upon execution at a host computer, with a firmware of the host computer to initiate said communication, said firmware being a BIOS, with a PXE BIOS.

7. The mobile phone of claim 1, wherein said connection interface is of a Universal Serial Bus or USB.

8. The mobile phone of claim 1, wherein said network updater is configured to interact, upon execution at a host computer, with a firmware of the host computer to initiate said communication, said firmware being an Extensible Firmware Interface (EFI) BIOS.

9. The mobile phone of claim 1, wherein said network updater is configured to interact, upon execution at a host computer, with a firmware of the host computer to initiate said communication, said firmware being a Unified Extensible Firmware Interface (UEFI) BIOS.

10. The mobile phone of claim 1, wherein said connection interface is an External Small Computer System Interface.

11. The mobile phone of claim 1, wherein said connection interface is an External Serial Advanced Technology Attachment or SATA.

12. The mobile phone of claim 1, wherein said connection interface is a Firewire.

13. The mobile phone of claim 1, wherein said connection interface is a Thunderbolt.

14. A system comprising:
a server to be contacted upon initiating communication over a network;
a host computer; and
a user trusted device comprising:
  a connection interface enabling connection with the host computer;
  a persistent memory storing a boot enabling data structure and a network updater, said persistent memory including:
    a secure memory, onto which is stored a first part of the network updater, and
    a non-secure memory, onto which is stored a second part of the network updater,
  wherein the second part of the network updater resides encrypted on the non-secure memory, a corresponding encryption key being stored on the secure memory,
  wherein the network updater includes a reference to said server, and is configured to interact, upon execution at the host computer, with a firmware of the host computer to initiate a communication over a network to which the host computer is connectable; and
  wherein the boot enabling data structure:
    is detectable by the firmware upon connection of the user trusted device with said host computer;
    is such that the host computer can boot from the user trusted device, as per a data structure of the boot enabling data structure; and
    includes instructions for the firmware to initiate a transfer of said network updater on the host computer for subsequent execution at the host computer, upon the host computer booting from the user trusted device.

15. A method of initiating communication between a user trusted device and a network, the user trusted device connectable to a host computer, said host computer connectable to said network, the method comprising:
  allowing a boot enabling data structure of the user trusted device be detected by a firmware of the host computer;
  booting the host computer from the user trusted device;
  transferring a network updater to the host computer, so that the network updater executes at the host computer and interacts with the firmware to initiate a communication over said network;
  storing a first part of the network updater on a secure memory;
  storing a second part of the network updater encrypted on a non-secure memory; and
  storing a corresponding encryption key on the secure memory.

16. The method of claim 15, further comprising: causing said network updater to:
  interact with said firmware of the host computer;
  interact with a network card of the host computer; and
  initiate said communication over the network as enabled by said network card.

17. The method of claim 15, further comprising contacting a server referenced by the network updater, upon initiating said communication over the network.

18. The method of claim 17, further comprising:
  transferring data from the server to the user trusted device, wherein the data is a user trusted device firmware update;
  storing said transferred data on a memory of the user trusted device, wherein the memory is a persistent memory; and
  updating software of the user trusted device according to the transferred data as stored on the memory of the user trusted device.

19. A computer program product for initiating communication between a user trusted device and a network, the computer program product comprising a non-transitory computer-readable storage medium having program code embodied therewith, program code readable/executable by a device to:
  enable a connection interface and a host computer to connect;
  store a boot enabling data structure and a network updater in a persistent memory;
  wherein the network updater is configured to interact, upon execution at a host computer, with a firmware of the host computer to initiate a communication over a network to which the host computer is connectable; and
  wherein the boot enabling data structure:
    is detectable by the firmware upon connection of the user trusted device with said host computer;
    is such that host computer can boot from the user trusted device, as per the data structure of the boot enabling data structure; and
    includes instructions for the firmware to initiate a transfer of said network updater on the host computer for subsequent execution at the host computer, upon the host computer booting from the user trusted device;
  store a first part of the network updater on a secure memory;
  store a second part of the network updater encrypted on a non-secure memory; and
  store a corresponding encryption key on the secure memory.

20. A computer program product for initiating communication between a user trusted device and a network, the computer program product comprising a non-transitory computer readable storage medium having program code embodied therewith, the program code readable/executable by a device to perform a method according to claim 15.

* * * * *